United States Patent
Flores et al.

(10) Patent No.: US 11,275,597 B1
(45) Date of Patent: Mar. 15, 2022

(54) INTERACTION-BASED VISUALIZATION TO AUGMENT USER EXPERIENCE

(71) Applicant: International Business Machines Corporation, Armonk, NY (US)

(72) Inventors: German H Flores, Carmichael, CA (US); Eric Kevin Butler, San Jose, CA (US); Robert Engel, San Francisco, CA (US); Aly Megahed, San Jose, CA (US); Yuya Jeremy Ong, San Jose, CA (US); Nitin Ramchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/162,080

(22) Filed: Jan. 29, 2021

(51) Int. Cl.
*G06F 9/451* (2018.01)
*G06N 3/02* (2006.01)
*G06T 11/60* (2006.01)

(52) U.S. Cl.
CPC ............ *G06F 9/451* (2018.02); *G06N 3/02* (2013.01); *G06T 11/60* (2013.01); *G06T 2200/24* (2013.01)

(58) Field of Classification Search
CPC .... H04N 1/32267; G06N 3/082; G06N 20/00; G06N 3/08; G06N 5/04; G06T 11/206; H04L 67/22
See application file for complete search history.

(56) References Cited

U.S. PATENT DOCUMENTS

| | | | |
|---|---|---|---|
| 8,520,000 B2 | 8/2013 | Duncker et al. | |
| 9,979,758 B2 | 5/2018 | Duncker et al. | |
| 10,445,355 B2 | 10/2019 | Miller et al. | |
| 10,614,159 B2 | 4/2020 | Apps et al. | |
| 2010/0005411 A1 | 1/2010 | Duncker et al. | |
| 2011/0038542 A1* | 2/2011 | Barkan | G06Q 10/10 382/182 |
| 2015/0135043 A1 | 5/2015 | Apps et al. | |
| 2015/0237085 A1 | 8/2015 | Duncker et al. | |
| 2017/0293685 A1 | 10/2017 | Miller et al. | |

(Continued)

OTHER PUBLICATIONS

Smikov et al., "Embedding Projector: Interactive Visualization and Interpretation of Embeddings," published Nov. 16, 2016, downloaded from https://arxiv.org/pdf/1611.05469.pdf (Year: 2016).*

(Continued)

*Primary Examiner* — Eric J Yoon
(74) *Attorney, Agent, or Firm* — Anthony Curro; Michael J. Chang, LLC

(57) ABSTRACT

Techniques for augmenting data visualizations based on user interactions to enhance user experience are provided. In one aspect, a method for providing real-time recommendations to a user includes: capturing user interactions with a data visualization, wherein the user interactions include images captured as the user interacts with the data visualization; building stacks of the user interactions, wherein the stacks of the user interactions are built from sequences of the user interactions captured over time; generating embeddings for the stacks of the user interactions; finding clusters of embeddings having similar properties; and making the real-time recommendations to the user based on the clusters of embeddings having the similar properties.

20 Claims, 10 Drawing Sheets

(56) References Cited

U.S. PATENT DOCUMENTS

2018/0330248 A1* 11/2018 Burhanuddin ......... G06N 20/10
2021/0406913 A1* 12/2021 Yao ..................... G06Q 30/016

OTHER PUBLICATIONS

S. Ntoa et al., "UX Design of a Big Data Visualization Application Supporting Gesture-Based Interaction with a Large Display," HCI International 2017, Conference Paper (Jul. 2017) (14 pages).

H. Slay et al., "Interaction Modes for Augmented Reality Visualization," Australian Symposium on Information Visualisation, Sydney, Dec. 2001 (5 pages).

A. Nimkoompai et al., "Enhancing User Experience for Mobile Learning Using Augmented Reality and Learning Style," Journal of University of Babylon, Pure and Applied Sciences, vol. 27, No. 1, pp. 345-355 (Apr. 2019).

Disclosed Anonymously, "Visualization Recommendation System Using a Hybrid Machine Learning Approach," IPCOM000260192D (Oct. 30, 2019) (4 pages).

Disclosed Anonymously, "A Method and System for Simplifying Visualization and Interaction for Sunburst Chart in Touch Screen," IPCOM000248329D (Nov. 15, 2016) (7 pages).

Disclosed Anonymously, "Real Time Visual Recommendations," IPCOM000226009D (Mar. 20, 3013) (4 pages).

Kong et al., "Graphical Overlays: Using Layered Elements to Aid Chart Reading," IEEE transactions on visualization and computer graphics 18.12 (Oct. 2012) (8 pages).

Jung et al., "ChartSense: Interactive Data Extraction from Chart Images," Proceedings of the 2017 CHI Conference on Human Factors in Computing Systems, May 2017 (12 pages).

Savva et al., "ReVision: Automated Classification, Analysis and Redesign of Chart Images," UIST '11: Proceedings of the 24th annual ACM symposium on User interface software and technology, Oct. 2011 (10 pages).

Liu at el., "Data Extraction from Charts via Single Deep Neural Network," arXiv preprint arXiv:1906.11906v1 (Jun. 2019) (10 pages).

Will Koehrsen, "Neural Network Embeddings Explained," Towards Data Science, Oct. 2018 (13 pages).

Mell et al., "The NIST Definition of Cloud Computing," NIST Special Publication 800-145, Sep. 2011 (7 pages).

* cited by examiner

Ideal sequence (user knows exactly what type of chart is needed):

Seq 1 = $\{I_1, I_2, I_3, I_4, I_5, I_6, I_7, I_8, I_9, I_{10}\}$

Search sequence (user investigating data to find needed chart):

Seq 1 = $\{I_1, I_2, I_3, I_4, I_5, I_6, I_7, I_8, I_9, I_{10}\}$ ⎫
Seq 2 = $\{I_1, I_2, I_3, I_4, I_5\}$ ⎬ Negative sequences
Seq 3 = $\{I_1, I_2, I_3, I_4, I_5, I_9, I_{11}, I_{12}\}$ ⎭
Seq 4 = $\{I_1, I_2, I_3, I_4, I_5, I_9, I_{11}, I_{12}, I_7\}$ } Positive sequence

INTERACTION-BASED VISUALIZATION TO AUGMENT USER EXPERIENCE

FIELD OF THE INVENTION

The present invention relates to data visualization, and more particularly, to techniques for augmenting data visualizations based on user interactions to enhance user experience.

BACKGROUND OF THE INVENTION

Data visualization refers to the graphical representation of information and data in a format such as a chart or graph. Current computer-based data visualization technology enables user interaction such as manipulating and exploring graphical components to obtain the data that is most meaningful to the user.

The reading and understanding of a data visualization involves a combination of perceptual and cognitive processes such as extracting, comparing and/or aggregating information. Graphical perception is the visual decoding and interpretation of information from a visualization by a user. The graphical perception of a user is impacted by the visual encoding and styling of the visualization.

For instance, overlapping or grouped visual entities in a visualization may be confusing. These configurations can require users to interact with the graphical component to choose the right set of visual entities to view and/or restrict the amount of data given to the system at a given point in time. For instance, it might not be easy for a user to see all the data since it might be "hidden" behind other data (data is overlapped by other data) and/or some systems might not show all the data to the user at a given point of time since it is too much data and the system makes assumptions as to what data to show, and/or truncates some of the data. Thus, if a user is not careful, the user might get confused, omit some data, and might not be able to properly analyze the data and display/showcase meaningful data.

Data visualizations such as charts or graphs are a popular and preferred way of easily and compactly representing important numerical data. Although two charts or graphs belong to the same chart type (for example both are pie charts or bar graphs), their styles can be significantly different. As a result, a user's view of the numerical data can vary from chart to chart and graph to graph.

Further, users can spend a significant amount of time inspecting and interacting with a chart or graph in order to decode the data it contains. In many cases, this decoding process is repeated over and over again, e.g., each time a user opens the chart or graph. Doing so is extremely repetitive and time-consuming, making it more difficult for users to effectively and efficiently obtain the data they seek.

Therefore, data visualization techniques for enhancing user experience would be desirable.

SUMMARY OF THE INVENTION

The present invention provides techniques for augmenting data visualizations based on user interactions to enhance user experience. In one aspect of the invention, a method for providing real-time recommendations to a user is provided. The method includes: capturing user interactions with a data visualization, wherein the user interactions include images captured as the user interacts with the data visualization; building stacks of the user interactions, wherein the stacks of the user interactions are built from sequences of the user interactions captured over time; generating embeddings for the stacks of the user interactions; finding clusters of embeddings having similar properties; and making the real-time recommendations to the user based on the clusters of embeddings having the similar properties.

A more complete understanding of the present invention, as well as further features and advantages of the present invention, will be obtained by reference to the following detailed description and drawings.

DETAILED DESCRIPTION OF PREFERRED EMBODIMENTS

Figure 1:
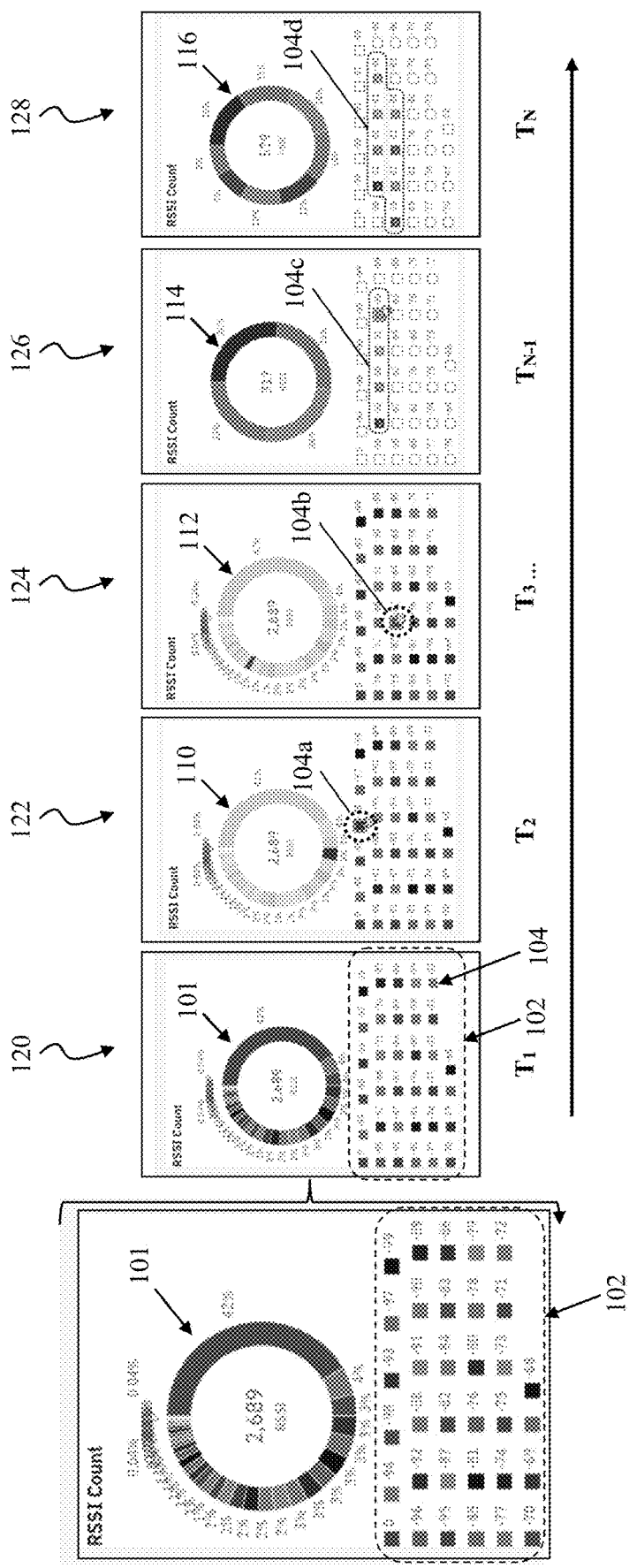
FIG. 1 is a diagram illustrating exemplary user interactions with a chart that occur over time according to an embodiment of the present invention.

Data visualizations such as user-interactive charts, graphs, tables, reports, video, etc. are an effective and compact way of representing numerical data. Users interacting with a data visualization can spend a significant amount of time decoding the data it contains. Further, this process can vary depending on the particular data being extracted. For instance, different visual encodings might be relevant to engineer-related data in charts, graphs, tables, reports, video, etc., as opposed to marketing or sales-related data, and vice versa.

Unfortunately, this decoding process is often repeated by users over and over again to obtain the desired data from a data visualization. Having to invest the time and effort associated with making repetitive actions detracts from the overall user experience of working with interactive data visualization technology.

Existing machine learning (ML)/deep learning (DL) model-based pipelines focus on ingesting and pre-processing data, training models, performing inference, and generating results shown in various formats (e.g., charts, graphs, tables, reports, video, etc.). Users interact with these charts, graphs, tables, reports, video, etc. to further analyze results generated by the ML-DL models. To improve the results generated by the pipeline, more data are introduced, models are fine-tuned, etc. However, user interactions are typically ignored or discarded, yet they contain valuable information that could be re-integrated back into the pipeline in order to improve accuracy and/or to recommend other representations or additional information as the user interacts with a chart, graph, table, report, video, etc.

Advantageously, it has been found herein that visual encodings inspected by users in an interactive chart, graph, table and/or report, video, etc. leave a series of fingerprints and traces that can be assembled into a historical heatmap-like stack of images/visualizations (also referred to herein as an "image stack"). A 'heatmap' is a type of data visualization where color and/or shading hue or shading intensity are used to represent magnitude. This image stack can then be leveraged to aid in the recommendation, guidance, and fine-tuning of machine-learning models used to generate visual encodings in real-time while the user interacts with the chart, graph, table, report, video, etc. By way of example only, some recommendations that can be made to the user include, but are not limited to, making personalized recommendation of an optimal chart, graph, table, report, video, etc. or series of optimal charts, graphs, tables, reports, video, etc. for a particular user(s), making audience-based recommendations (e.g., by customizing the level of detail a chart, graph, table, report, video, etc. needs for an engineer versus a marketing or sales representative), and making recommendations of other types of charts, graphs, tables, reports, video, etc. that might provide a helpful representation or summary of the data.

The term 'visual encoding,' as used herein, refers generally to the representation of information as any type of visual element on a chart, graph, table, report, video, etc. For instance, by way of example only, information can be represented in this manner as slices on a pie chart, bars on a bar graph, etc. In other words, the visual elements in a chart, graph, table, report, video, etc. represent visual encodings of the information contained in the chart, graph, table, report, video, etc. An online/computer report can contain various visual elements in it including, but not limited to, charts, graphs, tables and/or videos, etc. that a user can interact with. Further, while reference is made herein to data visualizations such as charts, graphs, tables, reports, video, etc., it is to be understood that the present techniques are broadly applicable to any form of user input that can be captured and used to identify some personalized features of the user. For example, other types of user input that may be implemented in accordance with the present techniques include, but are not limited to, text, audio, etc. For instance, by way of example only, audio can be converted to spectrograms to provide visual representations of the spectrum of frequencies of signals over time.

As will be described in detail below, the image stack is built from user interactions with the chart, graph, table, report, video, etc. For instance, FIG. 1 is a diagram illustrating exemplary user interactions with a chart that occur over time. As shown in FIG. 1, chart 101 has a legend 102 including a plurality of values 104. In this particular example, users can interact with chart 101 by placing their computer mouse cursor on certain values 104 in the legend 102 and/or by clicking on one or more of the values 104 in the legend 102 in order to select/deselect those values. Doing so will change the appearance of chart 101. The notion is that a user will perform these actions in order to go from the chart the system initially generates to a chart the user desires. The user interactions used to go from the initial chart to the desired chart encompass the continuous adding and/or removal of overlays. As is generally known to those in the art, a computer mouse is a user-controlled device that is employed to move a mouse cursor (also known as a mouse arrow or mouse pointer) over a graphical user interface, and indicates where the computer mouse should perform its next action, e.g., clicking on value(s) 104 in legend 102 selected by the mouse cursor.

By way of example only, at time $T_1$ the system initially displays the chart where, by default, all of the values 104 in legend 102 are selected (see user interaction 120). As such, at time $T_1$, all of the values 104 are displayed in chart 101. As provided above, the user interactions used to go from the initial chart to the desired chart encompass the continuous adding or removal of overlay images (or simply "overlay"). Thus, each user interaction may also be referred to herein as an overlay image. At time $T_2$, the user interacts with the chart by placing the computer mouse cursor on a certain value 104a in the legend 102. Doing so changes the appearance of the chart (now given reference numeral 110 so as to distinguish it from the other overlays) in order to highlight the respective value 104a (see user interaction 122). At time $T_3$, the user again interacts with the chart by placing the computer mouse cursor on another, different value 104b in the legend 102. Doing so changes the appearance of the chart (given reference numeral 112 so as to distinguish it from the other overlays) in order to highlight the respective value 104b (see user interaction 124).

As provided above, initially all of the values 104 in legend 102 were selected by default. At time $T_{N-1}$, the user then clicks on one or more of the values 104 in legend 102 in order to select only a subset 104c of values in the legend 102 (and deselecting all other remaining values in legend 102). Doing so changes the appearance of the chart (given reference numeral 114 so as to distinguish it from the other overlays) in order to display only the four selected values 104c (see user interaction 126). At time $T_N$, the user then clicks on another one or more of the values 104 in legend 102 in order to select only a subset 104d of values in the legend 102 (and deselecting all other remaining values in legend 102). Doing so changes the appearance of the chart (given reference numeral 116 so as to distinguish it from the other overlays) in order to display only the eight selected values 104d (see user interaction 128).

These user interactions 120-128 (i.e., overlays) leave a series of fingerprints and traces that are assembled into an image stack. To use the scenario depicted in FIG. 1 as an example, the image stack is a collection of the images (visualizations) from the user interactions 120-128 arranged in sequence according to the time T of the interactions. The image stack is then used to train a neural network to guide and recommend data or other information from the chart, graph, table, report, video, etc. to the user in real-time, i.e., while the user is interacting with the chart, graph, table, report, video, etc. The process operates via a feedback loop, where the recommended data/information is presented to the user whose interactions then further contribute to the image stack training data, and so on.

Figures 2, 3:
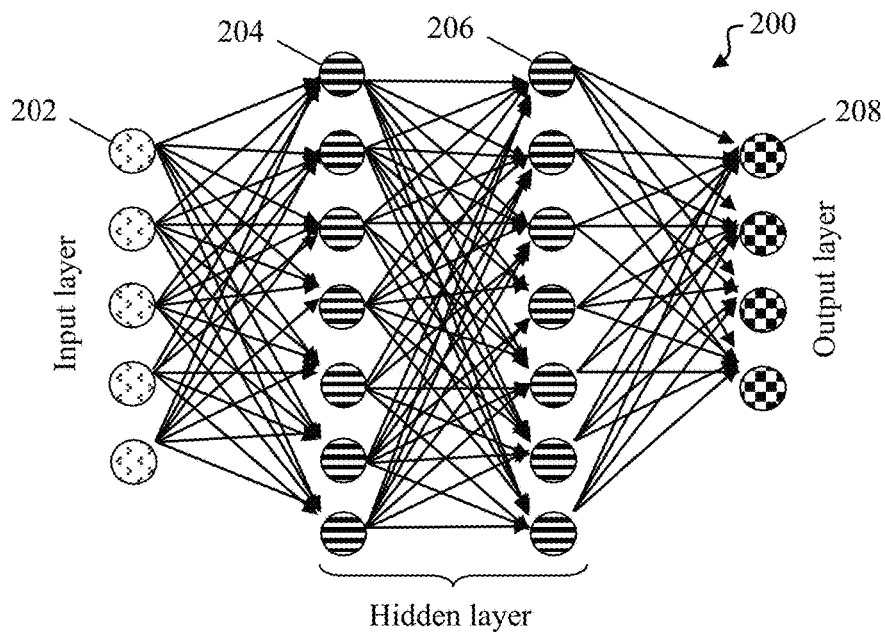
FIG. 2 is a schematic diagram illustrating an exemplary deep neural network according to an embodiment of the present invention.
FIG. 3 is a diagram illustrating an example of positive and negative sequences of user interactions according to an embodiment of the present invention.

Neural networks are often embodied as so-called "neuromorphic" systems of interconnected processor elements that act as simulated "neurons" that exchange "messages" between each other in the form of electronic signals. See, for example, FIG. 2 which provides a schematic illustration of an exemplary neural network 200. As shown in FIG. 2, neural network 200 includes a plurality of interconnected processor elements 202, 204/206 and 208 that form an input layer, at least one hidden layer, and an output layer, respectively, of the neural network 200. By way of example only, neural network 200 can be embodied in an analog crosspoint array of resistive devices such as resistive processing units (RPUs).

Similar to the so-called 'plasticity' of synaptic neurotransmitter connections that carry messages between biological neurons, the connections in a deep neural network that carry electronic messages between simulated neurons are provided with numeric weights that correspond to the strength or weakness of a given connection. The weights can be adjusted and tuned based on experience and/or by an iterative process (e.g., for large networks that consist of multiple layers, number of hidden and output nodes, etc.), making neural networks adaptive to inputs and capable of learning. For example, a neural network for image labeling is defined by a set of input neurons (see, e.g., input layer 202 in neural network 200) which may be activated by the pixels of an input image. After being weighted and transformed by a function determined by the network's designer, the activations of these input neurons are then passed to other downstream neurons, which are often referred to as 'hidden' neurons (see, e.g., hidden layers 204 and 206 in neural network 200). This process is repeated until an output neuron is activated (see, e.g., output layer 208 in neural network 200). The activated output neuron makes a decision.

The goal of the present techniques is to maximize the likelihood of taking the user (whom sequentially interacts with the chart, graph, table, report, video, etc.) to the final chart, graph, table, report, video, etc. that provides information the user needs. Referring to the scenario described in conjunction with the description of FIG. 1 above, assume for example that chart 116 at time $T_N$ (where the subset of 8 values 104d is selected) is the final chart that provides the information the user needs. In order to go from $T_1$ to $T_N$, the user might select or deselect and/or interact with a chart in various different ways to reach the desired final chart. The interactions between $T_1$ and $T_{N-1}$ that did not lead to the final chart (e.g., interactions 122 and 124) are considered negative sequences since they contain interactions that lead to a chart, but not the final desired chart $T_N$. However, at some point, the user is going to reach a final chart the user is happy with. The direct sequence that led to this final chart then becomes the positive sequence since it includes the sequence of interactions from $T_1$ to $T_N$ that contains all the information needed to reach the final chart. In the example depicted in FIG. 1, this positive sequence can include $T_1$, $T_2$, $T_3$, . . . , $T_{N-1}$, $T_N$. This concept is further illustrated in FIG. 3.

In the example shown in FIG. 3, the user performs a series of interactions $I_n$ with the chart, graph, table, report, video, etc. in order to find the version that provides information the user needs. For instance, by way of a non-limiting example, a sales executive might interact with a chart of product data by highlighting, selecting, deselecting, etc. values until a version of the chart is found that provides information the sales executive needs to present to potential customers.

To visualize these interactions, see for example, the user interactions 120-128 shown in FIG. 1 and described above, where each interaction $I_j$ corresponds to a particular one of the overlays/user interactions 120-128 (i.e., each interaction over time is an image). Thus, the sales representative might interact with the chart by selecting (or deselecting) a particular value(s) to highlight in the chart and/or selecting (or deselecting) a subset of the visual elements displayed in the chart, as described above, until the chart displays the information the user needs.

In FIG. 3, under the heading 'Ideal sequence,' the sequence 1 (Seq 1) is a sequence of interactions $I_n$ that a user would take if the user knows exactly what type of chart is needed. In other words, the system outputs an initial chart, and the user knows exactly what interactions with the chart the user needs to take to in order reach the desired chart, in this example $I_{10}$. It could also be the case that the final chart (e.g., $I_{10}$ or $I_7$) is a previous recommendation that the user clicked on.

However, the user might decide that the final chart generated from Seq 1 could be better or improved. In that case, the user can further interact with the chart to find the needed chart. For instance, as shown under the heading 'Search sequence,' the user next removes overlays $I_6$, $I_7$, $I_8$, $I_9$, and $I_{10}$ to go from Seq 1 to sequence 2 (Seq 2). However, the user does not like the current state of the chart from Seq 2, and decides to interact more with the chart by adding overlays $I_9$, $I_{11}$, $I_{12}$, which is sequence 3 (Seq 3). Finally, the user just adds overlay $I_7$ to produce a chart the user likes, and the final sequence is sequence 4 (Seq 4). Thus, as shown in FIG. 3, Seq 4 is considered a positive sequence. It is notable that, as in the present example, the final chart might be a previous recommendation. For instance, overlay $I_7$, which is the final chart in positive sequence Seq 4, was a previous recommendation.

In this example, the user interacted with Seq 1 and eventually reached Seq 4, which the user liked better. As such, Seq 1 is now considered a negative sequence, as are Seq 2 and Seq 3 (none of which led to overlay $I_7$). See FIG. 3. It is notable that Seq 1 initially could have been/was positive, but because the user interacted with Seq 1 and generated Seq 2, Seq 3 and Seq 4, then Seq 1 became negative.

The notion is that the next time the user wishes to reach the same final sequence, the system would recommend the positive sequence (Seq 4): $I_1$-$I_2$-$I_3$-$I_4$-$I_5$-$I_9$-$I_{11}$-$I_{12}$-$I_7$, and the user will not have to go through all the other 3 negative sequences (Seq 1, Seq 2 and Seq 3). If desired, the user can still go through the process of selecting a final ordered sequence that the user is happy with (such as in the example above where the user wishes to improve on the chart generated from Seq 1). Still, in that case, if it took the user, for example, 10 minutes to reach the (Seq 4): $I_1$-$I_2$-$I_3$-$I_4$-$I_5$-$I_9$-$I_{11}$-$I_{12}$-$I_7$, the various interactions with that chart can be reduced by 10 mins if the user selects the system-recommended chart to begin with. Namely, the user can then interact with the recommended chart and make additional changes, but the time would most likely be less than 10 minutes.

Figure 4:
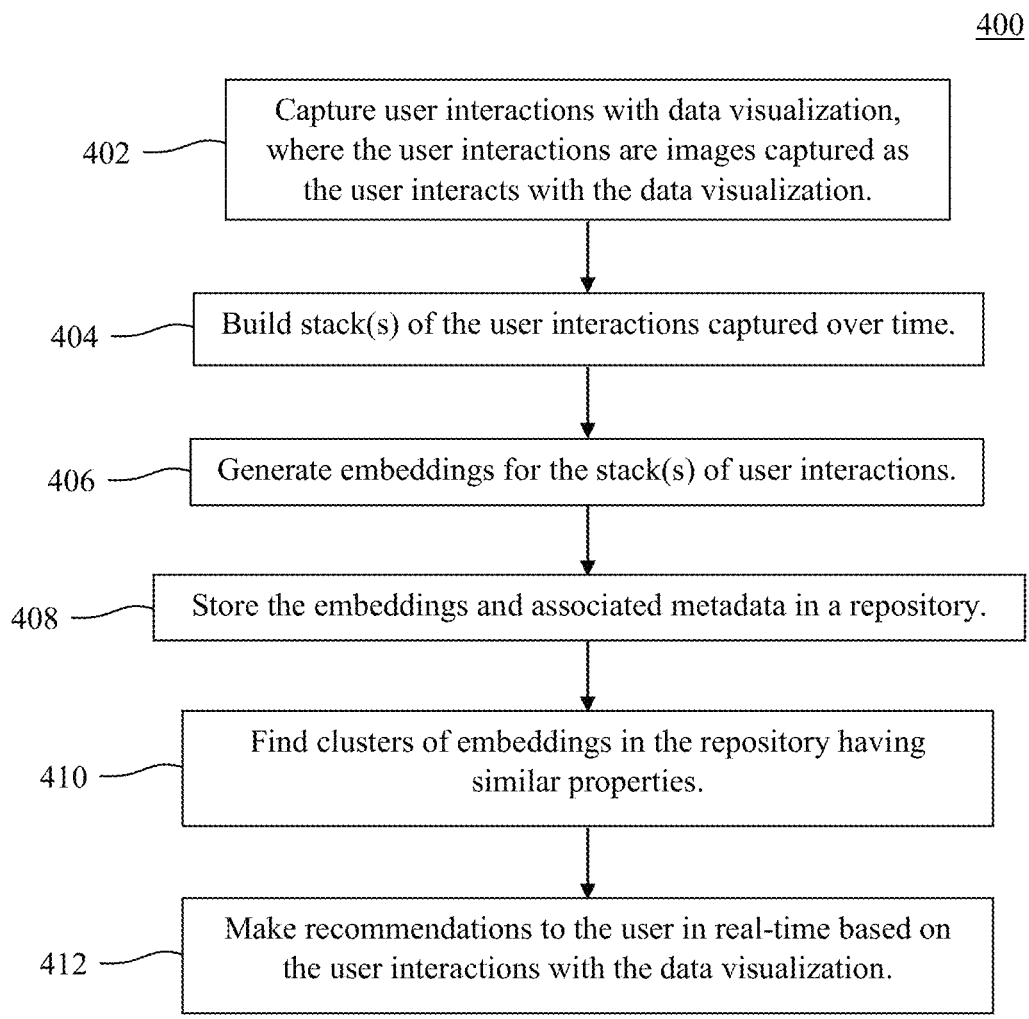
FIG. 4 is a diagram illustrating an exemplary methodology for providing real-time recommendations to a user according to an embodiment of the present invention.

Given the above overview, an exemplary methodology 400 for building an image stack from user interactions to provide real-time recommendations to a user is now described by way of reference to FIG. 4. As highlighted above, by 'real-time' it is meant that the recommendations are provided to the user as the user interacts with a data visualization such as a chart, graph, table, report and/or video, etc.

In step 402, interactions (i.e., overlay images) are captured as a user interacts with a data visualization. According to an exemplary embodiment, the data visualization is a digital, user-interactive plot such as a chart, graph, table, report and/or video, etc. In some embodiments, the data visualization includes multiple plots such as a series of user-interactive charts, graphs, tables, reports and/or videos. By 'interactive,' it is meant that a user can manipulate the chart, graph, table, report and/or video, etc. in order to explore its graphical components. See, for instance, the example described in conjunction with the description of FIG. 1 above where the user can interact with a chart by placing the computer mouse cursor on certain values in the legend and/or by clicking on one or more of the values in the legend in order to select/deselect those values. As highlighted above, these user interactions generate digital overlay images which are captured in step 402.

At least one sequence of the overlay images captured (in step 402) over time $I_n^k$ is then used to build at least one stack of the user interactions (i.e., overlay images). See step 404. Accordingly, each stack of user interactions is built from a particular sequence of the user interactions (i.e., overlay images) captured over time as the user interacts with the chart, graph, table, report and/or video, etc. For instance, to use a simple illustration, say that the system outputs 5 charts to the user. The user might interact with all 5 charts, none of the charts, or some of the charts. If, for example, the user interacts with 3 of the charts then for each of the 3 charts that the user interacts with, multiple stacks of interactions are generated in step 404.

In step 406, embeddings are generated for the stack(s) of user interactions. According to an exemplary embodiment, an embedding is generated for each user interaction in the sequence(s) of the user interactions. As provided above, the user interactions generate a sequence(s) of overlay images. Thus, in step 406, embeddings are generated for the stack(s) of overlay images, whereby an embedding is generated for each overlay image in the sequence(s) of the overlay images. As will be described in detail below, these embeddings form clusters. Thus, in order to recommend a final chart, graph, table, report and/or video, etc. to the user, the most popular embedding needs to be calculated or generated from all embeddings in the space. See below.

According to an exemplary embodiment, the embeddings are generated in step 406 using a pre-trained neural network such as neural network 200 described in conjunction with the description of FIG. 2, above. Neural network embeddings are low-dimensional, learned continuous vector representations of discrete variables. See, for example, Will Koehrsen, "Neural Network Embeddings Explained," Towards Data Science, October 2018 (13 pages). As will be described in detail below, the neural network will be trained using examples of positive and negative embeddings as training data in order to generate embeddings.

In step 408, the embeddings and corresponding metadata are stored in a repository R. The metadata of a chart, graph, table, report and/or video, etc. contains various types of information needed to create that chart, graph, table, report and/or video, etc. and other general information. For instance, according to an exemplary embodiment the metadata includes attributes/characteristics such as, but not limited to, title, axes information, chart height and width information, tags, data type, data, labels, version number, legend information, creation time and/or units. Some of these attributes/characteristics are there for historical reasons (e.g., creation time, version number, etc.), some are there to describe how to build the chart, graph, table, report and/or video, etc. (e.g., title, axes information, chart dimensions, data type, data), and some could be there for example to help find an item when searching or browsing (e.g., tags, labels, etc.). These are just some of many attributes/characteristics.

Figure 5:
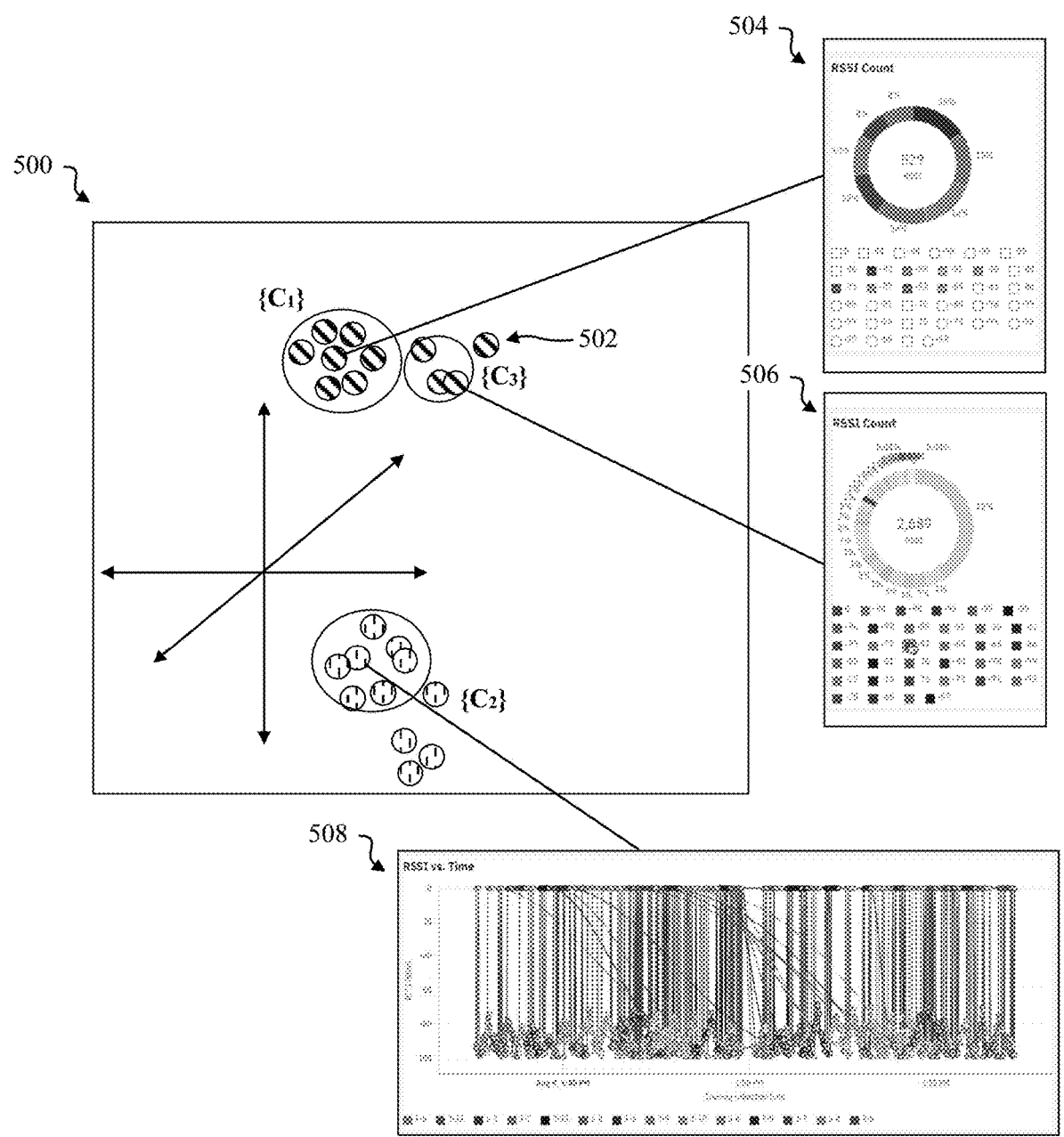
FIG. 5 is a diagram illustrating clusters of embeddings and how clusters having similar properties are located closer to one another according to an embodiment of the present invention.

In step 410, clusters of the embeddings in the repository R having similar properties are found. For instance, referring briefly to FIG. 5, an illustration 500 of this clustering process is provided. Namely, as shown in FIG. 5, a clustering process is used to find clusters $C_1$, $C_2$, $C_3$, etc. of embeddings 502 having similar properties. By way of example only, similar properties can include, but are not limited to, similar data, labels and/or data type. In that case, by 'similar properties' it is meant that the embeddings have similar data, labels and/or data type. Similar properties can also refer to similar user interactions. For instance, in FIG. 5 clusters $C_1$ and $C_3$ are close to each other since the charts/graphs are similar in type, data representation and/or user interactions. Conversely, cluster $C_2$ has dissimilar properties as compared to the other two clusters, and thus cluster $C_2$ is located farther away from clusters $C_1$ and $C_3$. According to an exemplary embodiment, the similarity of embeddings is measured using a standard similarity measure including, but not limited to, Euclidean distance, dot product or cosine similarity measures.

As highlighted above, the user interactions used to go from the initial chart to the desired chart encompass the continuous adding and/or removal of overlay images which generate a sequence of the overlay images over time and, in accordance with the present techniques, an embedding is generated for each overlay image in each sequence of the overlay images. Thus, each embedding 502 in FIG. 5 corresponds to a given overlay image, such as overlay images 504, 506 and 508.

Overlay images 504 and 506 are recognizable as some of the user interactions described in conjunction with the description of FIG. 1, above. Overlay image 508 is of a different type of chart from that of overlay images 504 and 506, and thus would be far away from the pie charts shown in overlay images 504 and 506 since they are of different types and the data representation is different and/or the data representation of charts/graphs of the same type varies greatly. Namely, another reason that embeddings could be far apart is that, even though they might be of the same type (e.g., both are pie chart embeddings), their meaningful data representation is different (e.g., having 15 overlay images which look very dense/complex versus having 4 overlay images and the user clearly sees the relationship between these 4 overlay images).

Figure 6:
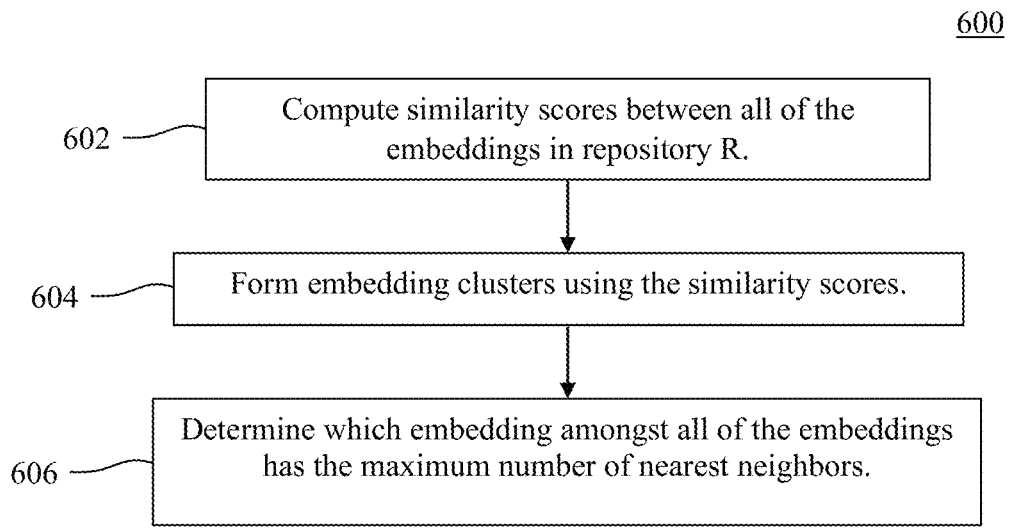
FIG. 6 is a diagram illustrating an exemplary methodology for finding clusters of embeddings having similar properties according to an embodiment of the present invention.

According to an exemplary embodiment, step 410 is performed to find clusters of the embeddings in the repository R having similar properties as described in conjunction with the description of methodology 600 of FIG. 6. Namely, in step 602, similarity scores are computed between all of the embeddings in the repository R. By way of example only, a process such as K-nearest-neighbors can be employed to compute the similarity scores. K-nearest-neighbors is a classification and regression technique that plots a dataset and determines the distance between data points in the dataset. This distance can serve as a similarity score which indicates the similarity of one or more of the data points to any given other data point in the plot.

In step 604, the embeddings are clustered using the similarity scores to form embedding clusters. For instance, in one exemplary embodiment, the nearest neighbors are grouped in step 604 to form the embedding clusters. For instance, using the K-nearest-neighbor example as an illustration, the embedding clusters can include the plotted data points in some sphere around a given point with a cutoff radius r. One may also simply cluster the K nearest neighbors.

As highlighted above, one goal of the present techniques is to enable making recommendations to the user based on previous user interactions with the data visualization. To do so, according to an exemplary embodiment, a determination is made in step 606 as to which embedding amongst all of the embedding clusters has the maximum number of nearest neighbors. Namely, similarity scores have been computed between all of the embeddings, and the embeddings were then clustered. Here the embedding, amongst all of the embedding clusters, with the greatest number of embeddings having similar properties (based on the similarity scores) is identified.

Referring back to methodology 400 of FIG. 4, in step 412 a recommendation is made in real-time to the user based on the previous user interactions with the data visualization. As provided above, by 'real-time' it is meant that the recommendations are provided to the user as the user interacts with the chart, graph, table, report and/or video, etc. According to an exemplary embodiment, the recommendation can be an overlay image or overlay images taken from the stack of user interactions, the metadata associated with these overlay image(s), or both, that are displayed to the user in real-time. For instance, one or more overlay images can be displayed as mini plots which the user can select and view.

If the recommendation includes overlay images taken from the stack of user interactions then, according to an exemplary embodiment, the final chart, graph, table, report and/or video, etc. or the optimal (i.e., positive) sequence of user interactions that led to the final chart, graph, table, report and/or video, etc. is recommended and shown to the user. If it is the metadata then, according to an exemplary embodiment, a summary of relevant metadata is recommended and shown to the user to guide the user as the user further interacts with the final chart, graph, table, report and/or video, etc.

When a chart, graph, table, report and/or video, etc. and/or metadata is recommended to a user, it is preferable that only pertinent information is displayed to the user, so as to not confuse the user or overload the user with a lot of information. For instance, when extracting components of interest in the metadata, the components selected should be the ones that are the most informative and useful, such as the components that define how to build the chart, graph, table, report and/or video, etc. Historical data and tags contain useful information, but for the user inspecting the chart, graph, table, report and/or video, etc., this just adds noise to the information recommended to the user, and should not be considered components of interest.

Figure 7:
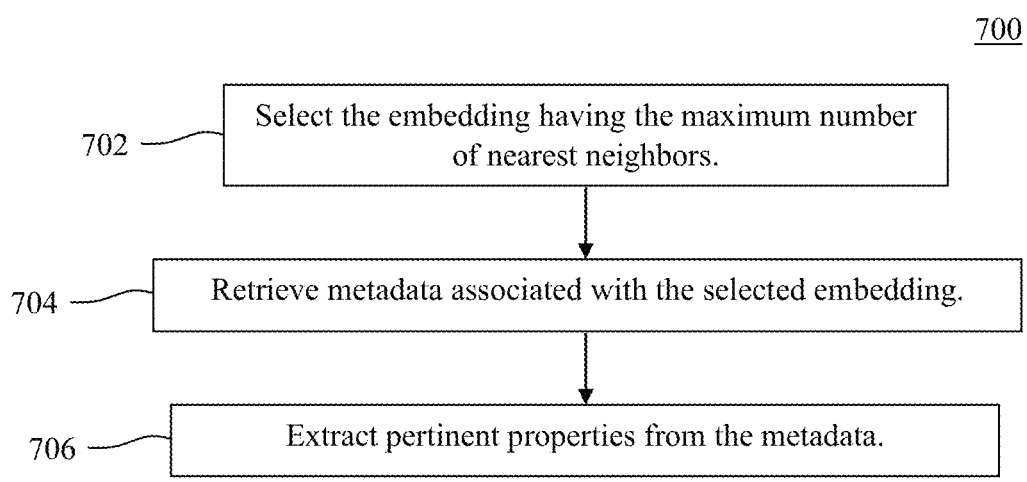
FIG. 7 is a diagram illustrating an exemplary methodology for making a recommendation according to an embodiment of the present invention.

The overlay image(s) and/or associated metadata that is recommended to the user in step 412 depends on the clusters of embeddings found in the repository having similar properties, as described above. For instance, referring briefly to FIG. 7, a methodology 700 for making a recommendation is now described.

In step 702, the embedding having the maximum number of nearest neighbors (determined as described in conjunction with the description of step 606 of methodology 600 of FIG. 6 above) is selected. As provided above, each embedding and its metadata is stored in the repository R. Thus, in step 704, the metadata associated with the selected embedding is retrieved from the repository R.

In step 706, pertinent properties are then extracted from the metadata associated with the selected embedding. These properties extracted from the metadata can then be used to build the user interaction (i.e., chart, graph, table, report and/or video, etc.) corresponding to the selected embedding, which is then displayed as a recommendation to the user in step 412 of FIG. 4 (in different forms, e.g., as a chart, graph, table, report and/or video, etc. optionally along with the associated metadata). As described above, these properties can include, but are not limited to, title, axes information, chart height and width information, data type, data, labels, legend information and/or units. As provided above, the metadata itself can also be provided to the user along with (or in lieu of) the chart, graph, table, report and/or video, etc.

Based on the above description, it can be seen that the real-time recommendations made to the user are not necessarily of the same type of chart, graph, table, report and/or video, etc. as the user is currently viewing. For instance, referring briefly back to FIG. 5, as provided above the overlay image 508 is of a different type of chart from that of overlay images 504 and 506. For example, overlay images 504 and 506 are a type of pie chart, while overlay image 508 is a line graph. The user might be currently viewing a pie chart. However, based on the above-described process, if the embedding having the maximum number of nearest neighbors is present in cluster $C_2$, then the real-time recommendation displayed to the user might be that of a line graph. Thus, according to an exemplary embodiment, the recommendations made to the user are of a different type of data visualization (i.e., a different type of chart, graph, table, report and/or video, etc.) than the user is currently viewing.

Figure 8:
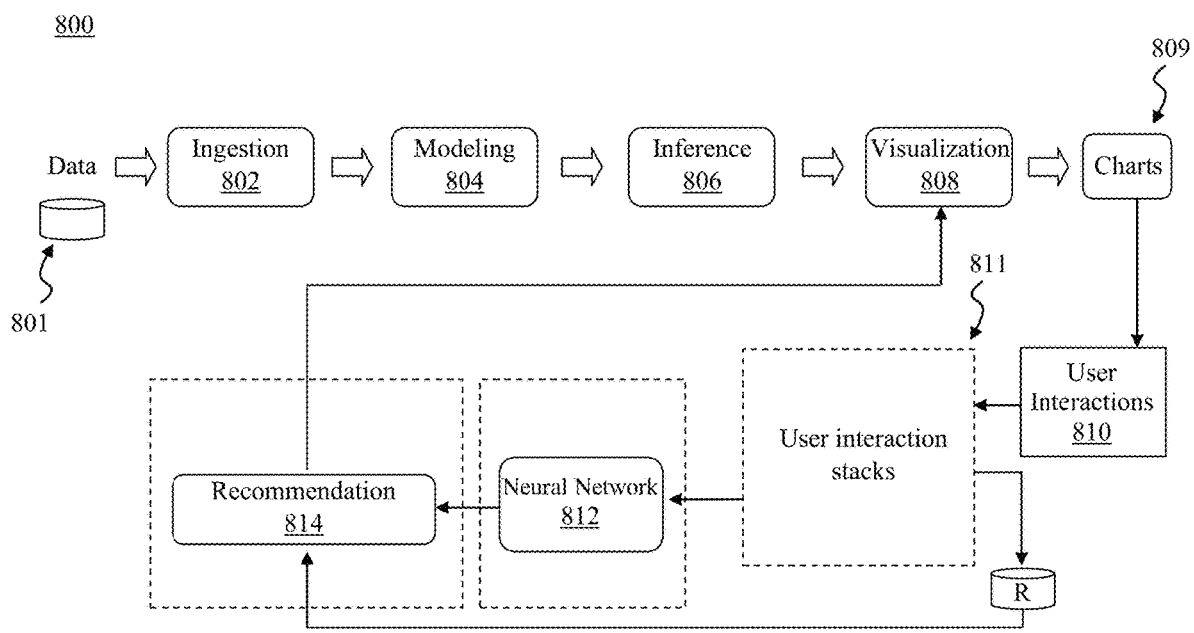
FIG. 8 is a diagram illustrating an exemplary methodology for integrating user interactions into a machine learning process for making real-time recommendations according to an embodiment of the present invention.

A summary of the present techniques for integrating user interactions into a machine learning process for making real-time recommendations is now provided by way of reference to methodology 800 of FIG. 8. As shown in FIG. 8, methodology 800 begins with a general data-train-inference (DTI) framework. Namely, in step 802 data is obtained from a database 801 or any other suitable repository. During this data ingestion step, the data can undergo pre-processing to enhance its quality and usefulness. For instance, normalization and/or noise reduction techniques can be applied to the data.

In step 804, a training phase, the data obtained (and preprocessed) in step 802 is then used to create models. The models are then validated, fine-tuned, etc. In step 806, an inference phase, the trained models are then used to perform tasks such as prediction, anomaly detection, classification, etc. In the context of the present techniques, the trained models are used to generate data visualizations in step 808. As highlighted above, this can involve generating charts, building tables, generating reports, etc. In FIG. 8, the generation of charts 809 is provided as a non-limiting example.

Notably, it is at this point in the process that the methodology 400 described in conjunction with the description of FIG. 4 above begins. Namely, the system provides the charts 809 to a user(s). The user(s) then interacts 810 with the charts 809, generating stacks 811 of user interactions 810. In step 812, embeddings are generated for the stacks 811 of the user interactions 810. As described above, embeddings are generated from a neural network trained using positive and negative embeddings. These embeddings and their associated metadata are stored in a repository R.

As described above, clusters of the embeddings having similar properties are found, and in step 814, real-time recommendations are made to the user based on the clusters. For instance, it can be determined which embedding has a maximum number of nearest neighbors. The associated metadata for that embedding can then be retrieved from the repository R and used to build the corresponding chart which, as per step 808, is then generated and displayed to the user. Alternatively, the metadata itself (along with or in lieu of the chart) can be displayed to the user.

Figure 9:
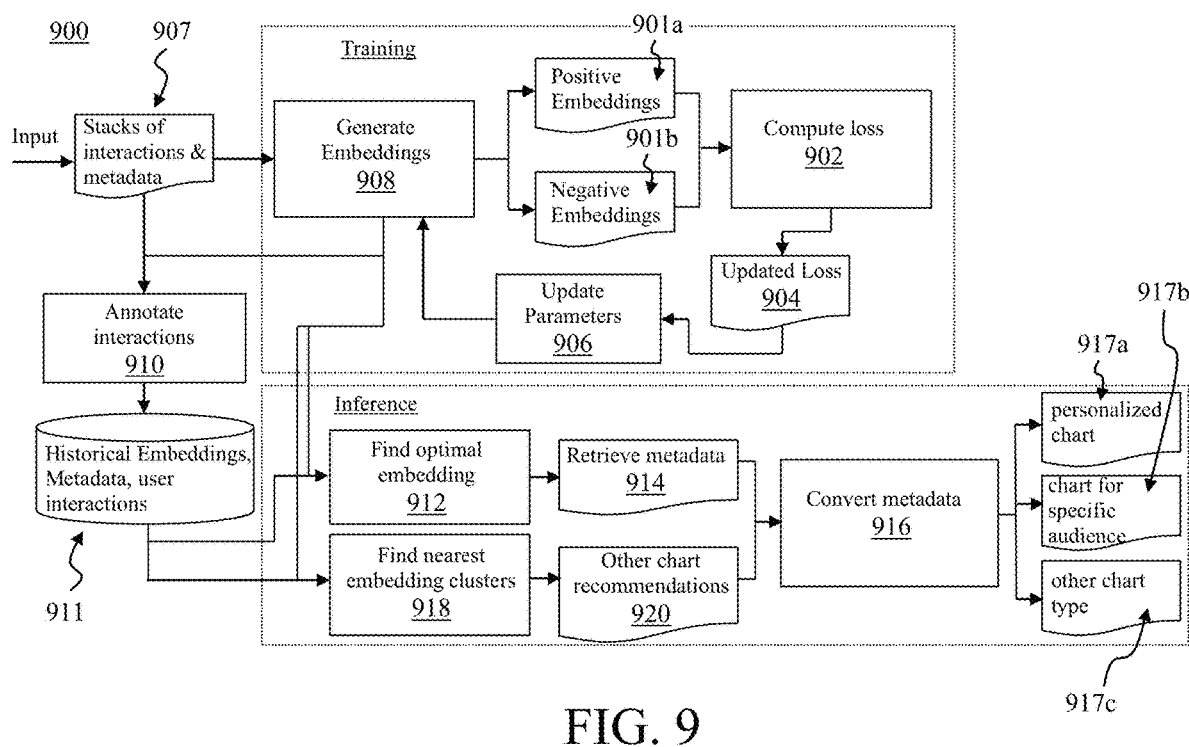
FIG. 9 is a diagram illustrating an exemplary methodology for neural network training and use thereof for making real-time recommendations according to an embodiment of the present invention.

The training and inference phases of the present techniques are further described by way of reference to methodology 900 of FIG. 9. As provided above, a neural network is used to generate embeddings for input stacks of user interactions. First however, the neural network is trained using positive embeddings 901a and negative embeddings 901b. As provided above, a sequence of user interactions that lead to a final desired chart is considered a positive sequence, and a sequence of user interactions that do not lead to the final desired chart is considered a negative sequence. An embedding is generated for each user interaction in the sequence. Thus, an embedding generated for a user interaction in a positive sequence is a positive embedding 901a, and an embedding generated for a user interaction in a negative sequence is a negative embedding 901b.

As provided above, the neural network can be embodied in an analog cross-point array of resistive devices such as RPUs. In that case, the RPU devices function as the weighted connections between neurons in the neural network. Neural networks are trained in an optimization fashion and thus employ an optimization technique like stochastic gradient descent (SGD). They require a loss function to calculate error as the neural network is trained. The mapping from the input layer to the output layer (see, e.g., FIG. 2—described above) needs to be learned from the training data, in this case the positive and negative embeddings 901a and 901b. The calculation then requires finding the best weights of the neural network with the goal to find the optimal weights of the model in order to make the best predictions. The model is trained using an optimization technique like SGD, and backpropagation (compute gradient of loss function) is then used to update the weights.

Thus, in order to minimize the error with the neural network, a cost or loss function is employed in step 902. The computation entails the standard process used by neural networks when training the model to minimize the error in order to have good prediction rates. In step 904 the calculated loss data is updated, and in step 906 the neural network parameters including weight values are updated.

During the inference phase, the trained neural network takes as input stacks of user interactions and associated metadata 907 and, in step 908, the neural network generates embeddings for each of the user interactions. In step 910, the input stacks of user interactions 907 are annotated with the embeddings and the data is stored in a database 911 or other suitable repository. The annotating performed in step 910 is done to associate an embedding with the original data that generated such embedding (the user interaction overlay images and/or associated metadata), and the embedding is stored along with the user interaction overlay images and/or associated metadata in database 911 (or other suitable repository). This is done in order to do the lookup to go from optimal embedding to the information recommended to the user. See, for example, methodology 700 described in conjunction with the description of FIG. 7, above. Namely, as shown in FIG. 9, the data from database 911 is used during the inference phase when the (historical) user interaction overlay images and/or associated metadata to recommend to the user need to be retrieved once the optimal embedding is found.

In step 912, the optimal embedding is found. As provided above, this is the embedding having the maximum number of nearest neighbors. As shown in FIG. 9, the embeddings (generated in step 908) can be employed in finding the optimal embedding (step 912). Namely, as the user is interacting with a chart, graph, table, report, text and/or video, etc., it is helpful to know what area in the space the user is currently "viewing," especially since there can be many different types of charts, graphs, tables, reports, text and/or video, etc. For instance, to use the K-nearest-neighbors method as an example, given an annotated (labeled) database the goal is to find the K-nearest-neighbors around this sample. Database 911 is the annotated/labeled database, and the embedding (generated in step 908) is the sample being provided from which to find the K-nearest neighbors.

In step 914, the metadata associated with the optimal embedding is retrieved, and in step 916, the metadata is used to build a personalized chart 917a, a chart for a specific audience 917b and/or other type of chart 917c. For instance, the metadata might contain a field of who the author was and/or a title (e.g., engineer, marketing, etc.) for a given set of user interactions. Thus, to use an illustrative, non-limiting example, when a user (e.g., a person in the marketing department) is interacting with a chart in order to generate a final chart to give to an engineer, the recommending system can look for nearby popular clusters that were generated by engineers and recommend these popular charts to the marketing person. Thus, according to an exemplary embodiment, the term 'audience' refers to a different job title (e.g., engineer, executive, sales person, researcher, etc.). As illustrated by 917a-c, there are multiple recommendations that can be provided to the user, e.g., a personalized chart, a chart for a specific audience, another type of chart, etc. Accordingly, there are different types of recommendations that can be shown individually or all at once.

Steps 918 and 920 refer to the case where the system makes a recommendation for a specific audience and/or other chart types which requires looking for nearby clusters. For instance, showing a personalized optimal chart to the user (as per step 917a) simply involves finding the optimal embedding, searching for K-nearest-neighbors, and showing this information to the user. However, in order to expand this concept to show a chart for a specific audience (as per step 917b) and/or other types of charts (as per step 917c), nearby clusters (cluster neighbors) need to be found from other users/other chart types (see step 918) and a recommendation made (see step 920) of the other chart types and/or charts viewed by other users. As such, the search space has to be widened and more processing performed to find these other clusters.

As will be described below, one or more elements of the present techniques can optionally be provided as a service in a cloud environment. For instance, the capturing of user interactions; stack building, embedding, clustering and/or making recommendations can be performed on a dedicated cloud server to take advantage of high-powered CPUs and GPUs, after which the result is sent back to the local device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
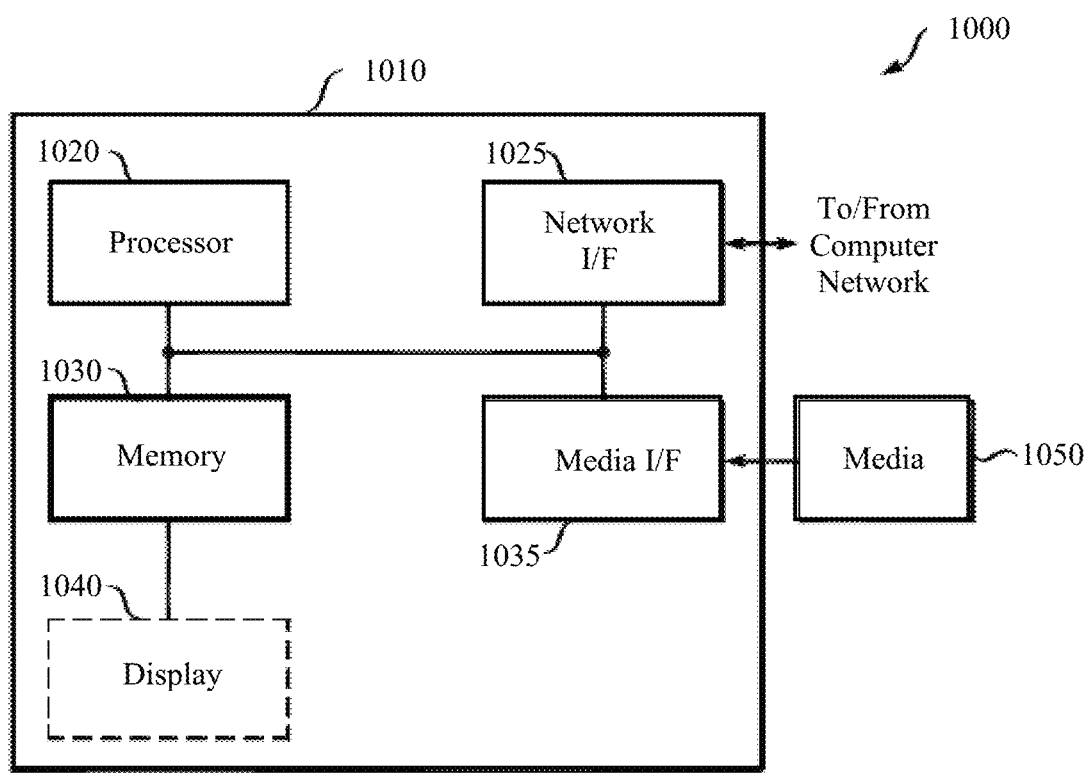
FIG. 10 is a diagram illustrating an exemplary apparatus for performing one or more of the methodologies presented herein according to an embodiment of the present invention.

Turning now to FIG. 10, a block diagram is shown of an apparatus 1000 for implementing one or more of the methodologies presented herein. By way of example only, apparatus 1000 can be configured to implement one or more of the steps of methodology 400 of FIG. 4, one or more of the steps of methodology 600 of FIG. 6 and/or one or more of the steps of methodology 700 of FIG. 7.

Apparatus 1000 includes a computer system 1010 and removable media 1050. Computer system 1010 includes a processor device 1020, a network interface 1025, a memory 1030, a media interface 1035 and an optional display 1040. Network interface 1025 allows computer system 1010 to connect to a network, while media interface 1035 allows computer system 1010 to interact with media, such as a hard drive or removable media 1050.

Processor device 1020 can be configured to implement the methods, steps, and functions disclosed herein. The memory 1030 could be distributed or local and the processor device 1020 could be distributed or singular. The memory 1030 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1020. With this definition, information on a network, accessible through network interface 1025, is still within memory 1030 because the processor device 1020 can retrieve the information from the network. It should be noted that each distributed processor that makes up processor device 1020 generally contains its own addressable memory space. It should also be noted that some or all of computer system 1010 can be incorporated into an application-specific or general-use integrated circuit.

Optional display 1040 is any type of display suitable for interacting with a human user of apparatus 1000. Generally, display 1040 is a computer monitor or other similar display.

Figure 11:
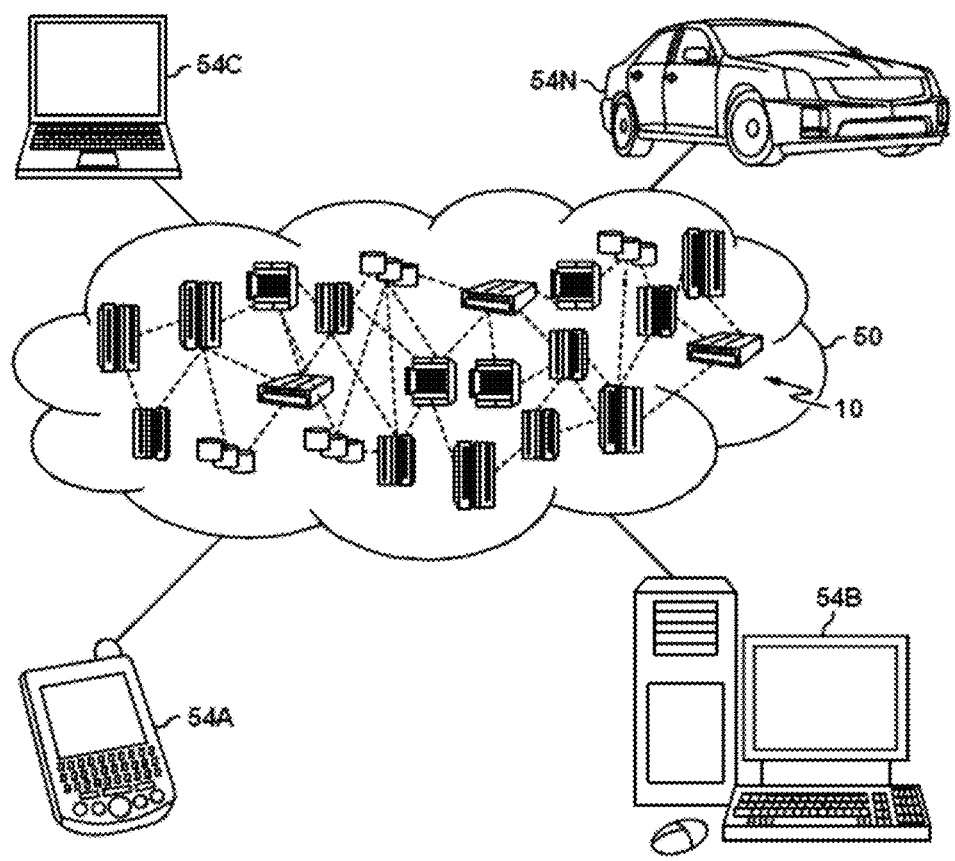
FIG. 11 depicts a cloud computing environment according to an embodiment of the present invention.
Figure 12:
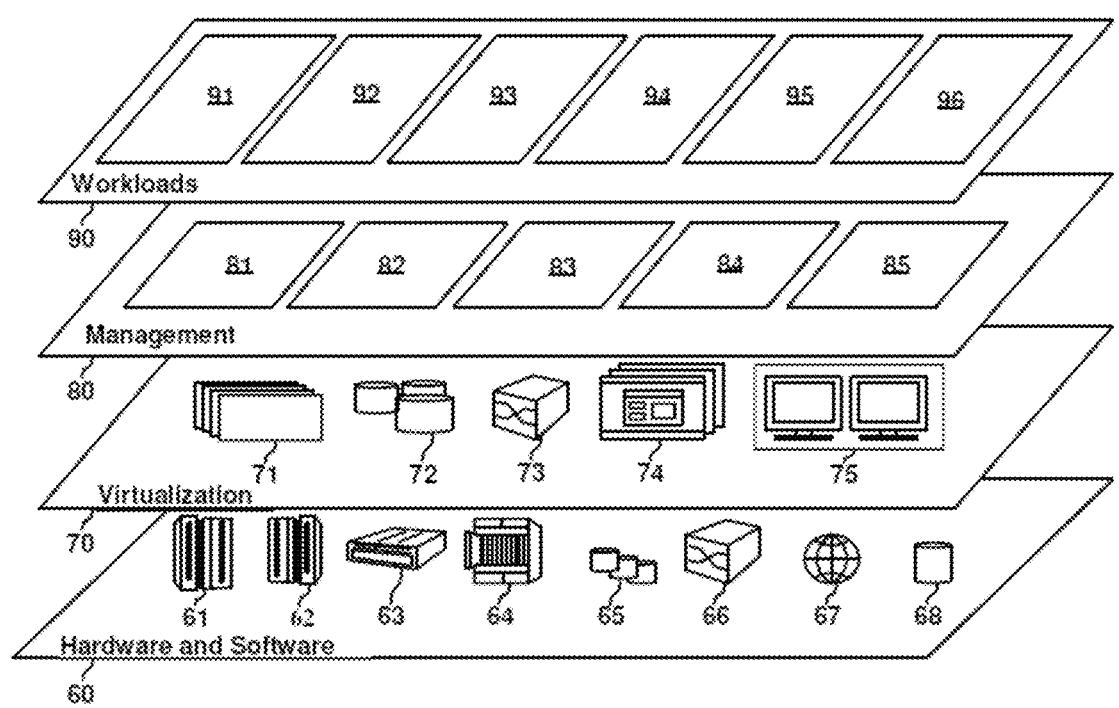
FIG. 12 depicts abstraction model layers according to an embodiment of the present invention.

Referring to FIG. 11 and FIG. 12, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing real-time recommendations 96.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for providing real-time recommendations to a user, the method comprising:
    capturing user interactions with a data visualization, wherein the user interactions comprise images captured as the user interacts with the data visualization;
    building image stacks of the user interactions, wherein the image stacks of the user interactions are built from sequences of the user interactions captured over time;
    generating embeddings based on the image stacks of the user interactions;
    finding clusters of the embeddings having similar properties; and
    making the real-time recommendations to the user based on the clusters of the embeddings having the similar properties.

2. The method of claim 1, further comprising:
    storing the embeddings and associated metadata in a repository.

3. The method of claim 1, wherein an embedding is generated for each user interaction in the sequences of the user interactions.

4. The method of claim 1, wherein the data visualization is selected from the group consisting of: a chart, a graph, a table, a report, video, and combinations thereof.

5. The method of claim 1, wherein the user interactions comprise overlay images, and wherein the image stacks of the user interactions are built from at least one sequence of the overlay images captured over time.

6. The method of claim 5, wherein an embedding is generated for each overlay image in the at least one sequence of the overlay images.

7. The method of claim 1, wherein the embeddings are generated from a neural network.

8. The method of claim 7, further comprising:
    pre-training the neural network using positive embeddings and negative embeddings.

9. The method of claim 1, further comprising:
    computing similarity scores between all of the embeddings; and
    forming the clusters of the embeddings having the similar properties using the similarity scores.

10. The method of claim 9, further comprising:
    determining which embedding has a maximum number of nearest neighbors.

11. The method of claim 10, further comprising:
    selecting the embedding having the maximum number of nearest neighbors;
    retrieving metadata associated with the embedding having the maximum number of nearest neighbors; and
    extracting properties from the metadata associated with the embedding having the maximum number of nearest neighbors.

12. The method of claim 1, wherein the real-time recommendations are selected from the group consisting of: at least one interaction from the image stacks of the user interactions, metadata associated with the at least one interaction, and combinations thereof.

13. The method of claim 12, wherein the real-time recommendations comprise the at least one interaction from the image stacks of the user interactions, and wherein the method further comprises:
    displaying to the user a sequence of the user interactions that led to the at least one interaction.

14. The method of claim 12, wherein the real-time recommendations comprise the metadata associated with the at least one interaction, and wherein the method further comprises:
    displaying to the user a summary of the metadata.

15. The method of claim 1, wherein the real-time recommendations comprise different types of data visualizations than the user is currently viewing.

16. A non-transitory computer program product for providing real-time recommendations to a user, the computer program product comprising a computer readable storage medium having program instructions embodied therewith, the program instructions executable by a computer to cause the computer to:

capture user interactions with a data visualization, wherein the user interactions comprise images captured as the user interacts with the data visualization;

build image stacks of the user interactions, wherein the image stacks of the user interactions are built from sequences of the user interactions captured over time;

generate embeddings based on the image stacks of the user interactions;

find clusters of the embeddings having similar properties; and make the real-time recommendations to the user based on the clusters of the embeddings having the similar properties.

17. The non-transitory computer program product of claim 16, wherein the program instructions further cause the computer to:

store the embeddings and associated metadata in a repository.

18. The non-transitory computer program product of claim 16, wherein the program instructions further cause the computer to:

compute similarity scores between all of the embeddings; and form the clusters of the embeddings having the similar properties using the similarity scores.

19. The non-transitory computer program product of claim 18, wherein the program instructions further cause the computer to:

determine which embedding has a maximum number of nearest neighbors.

20. The non-transitory computer program product of claim 19, wherein the program instructions further cause the computer to:

select the embedding having the maximum number of nearest neighbors;

retrieve metadata associated with the embedding having the maximum number of nearest neighbors; and extract properties from the metadata associated with the embedding having the maximum number of nearest neighbors.

\* \* \* \* \*